(12) United States Patent
Miller et al.

(10) Patent No.: US 10,320,141 B2
(45) Date of Patent: Jun. 11, 2019

(54) HARD TARGET DETECTION FOR OPTICAL SYSTEMS

(71) Applicant: Rosemount Aerospace Inc., Burnsville, MN (US)

(72) Inventors: Mark Sherwood Miller, Lakeville, MN (US); Mark Ray, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/784,799

(22) Filed: Oct. 16, 2017

(65) Prior Publication Data
US 2019/0115710 A1   Apr. 18, 2019

(51) Int. Cl.
| | | |
|---|---|---|
| *H01S 3/00* | (2006.01) |
| *G01S 7/481* | (2006.01) |
| *G01S 7/484* | (2006.01) |
| *G01S 17/02* | (2006.01) |

(52) U.S. Cl.
CPC .......... *H01S 3/0014* (2013.01); *G01S 7/484* (2013.01); *G01S 7/4818* (2013.01); *G01S 17/026* (2013.01)

(58) Field of Classification Search
CPC ........ H01S 3/014; G01S 7/4818; G01S 7/484; G01S 17/026
See application file for complete search history.

(56) References Cited

U.S. PATENT DOCUMENTS

| | | | |
|---|---|---|---|
| 6,130,754 A | 10/2000 | Greene | |
| 7,280,575 B2 | 10/2007 | Moran et al. | |
| 8,576,382 B2 | 11/2013 | LaValley et al. | |
| 9,594,066 B2 | 3/2017 | Knox et al. | |
| 9,702,803 B2 | 7/2017 | Knox et al. | |
| 2009/0219961 A1* | 9/2009 | Meyers | G01S 7/497 372/29.01 |
| 2009/0273770 A1* | 11/2009 | Bauhahn | G01C 3/08 356/5.01 |
| 2013/0265563 A1 | 10/2013 | Vogt et al. | |

FOREIGN PATENT DOCUMENTS

| | | |
|---|---|---|
| DE | 3903501 A1 | 8/1989 |
| DE | 102016103898 A1 | 3/2016 |

OTHER PUBLICATIONS

Extended European Search Report for EP Application No. 18199867.5, dated Mar. 7, 2019, Pages 9.

\* cited by examiner

*Primary Examiner* — Armando Rodriguez
(74) *Attorney, Agent, or Firm* — Kinney & Lange, P.A.

(57) ABSTRACT

A system and method for detecting hard targets in a free-space laser system includes a laser, an optical detector, and electronics. The laser is configured to emit a laser beam along an optical path through transmitter optics into a field of view. The optical detector is positioned along a laser transmitter path and configured to receive retroreflections of the laser beam. The electronics are configured to determine if an output of the optical detector is indicative of presence of a hard target within the field of view, and control the laser to a safe state if the output is indicative of presence of the hard target.

18 Claims, 4 Drawing Sheets

HARD TARGET DETECTION FOR OPTICAL SYSTEMS

BACKGROUND

The present invention relates generally to optical systems, and in particular to remote sensing systems such as light detection and ranging (lidar) systems.

Remote sensing systems, which may be implemented onboard aircraft, for example, are configured to inject light into an area of interest in order to monitor the environment within that area of interest. Because humans may enter the area of interest, eye safety must be ensured. For laser systems, eye safety has been handled using multiple methods. For example, the optical system may limit the projected wavelengths to eye safe wavelengths, such as wavelengths that fall outside of the range between 400 nm and 1400 nm. Optical systems may also utilize low power levels, and/or restrict access to the area of interest. While these methods may be effective at ensuring eye safety, they may not be practical for all applications. It is desirable to provide eye safety for optical systems that are unable to utilize these safety methods.

SUMMARY

In an example embodiment, a hard target detection system for a free-space laser system includes a laser, an optical detector, and electronics. The laser is configured to emit a laser beam along an optical path through transmitter optics into a field of view. The optical detector is positioned along a laser transmitter path and configured to receive retroreflections of the laser beam. The electronics are configured to determine if an output of the optical detector is indicative of presence of a hard target within the field of view, and control the laser to a safe state if the output is indicative of presence of the hard target.

In another example embodiment, a method of detecting hard targets in a free-space laser system includes emitting a laser beam along an optical path to transmitter optics; directing, by the transmitter optics, the beam into a field of view along a laser transmitter path; receiving, by an optical detector positioned along the laser transmitter path, retroreflections of the laser beam; detecting a hard target within the field of view based on the retroreflections; and controlling the laser to a safe state if the hard target is detected within the field of view.

DETAILED DESCRIPTION

Hard target detection for a free-space laser system is disclosed herein that controls an operational state of a laser upon detection of a hard target within a field of view of the laser transmitter. The free-space laser system may be a remote sensing system, for example, or other optical system. The remote sensing system includes, among other things, a laser, transmitter and receiver optics, and control electronics. The laser emits a laser beam along an optical path, through transmitter optics, and into an area of interest, such as the atmosphere external to an aircraft. This area of interest may become occupied by a person or other hard target. If the emitted laser is above eye-safe levels, it is desirable to control the laser into a safe state upon detection of a hard target within the field of view of the transmitted laser beam.

An optical detector is positioned along the laser transmitter path to receive retroreflections of the laser beam. The retroreflections may be directed to the optical detector using a tap or other method, for example. The retroreflections may be monitored to determine if a hard object has entered the field of view of the laser transmitter. For example, if the amplitude of the retroreflection is greater than a threshold, the laser may be turned off, or controlled to a reduced, eye-safe intensity.

Figure 1:
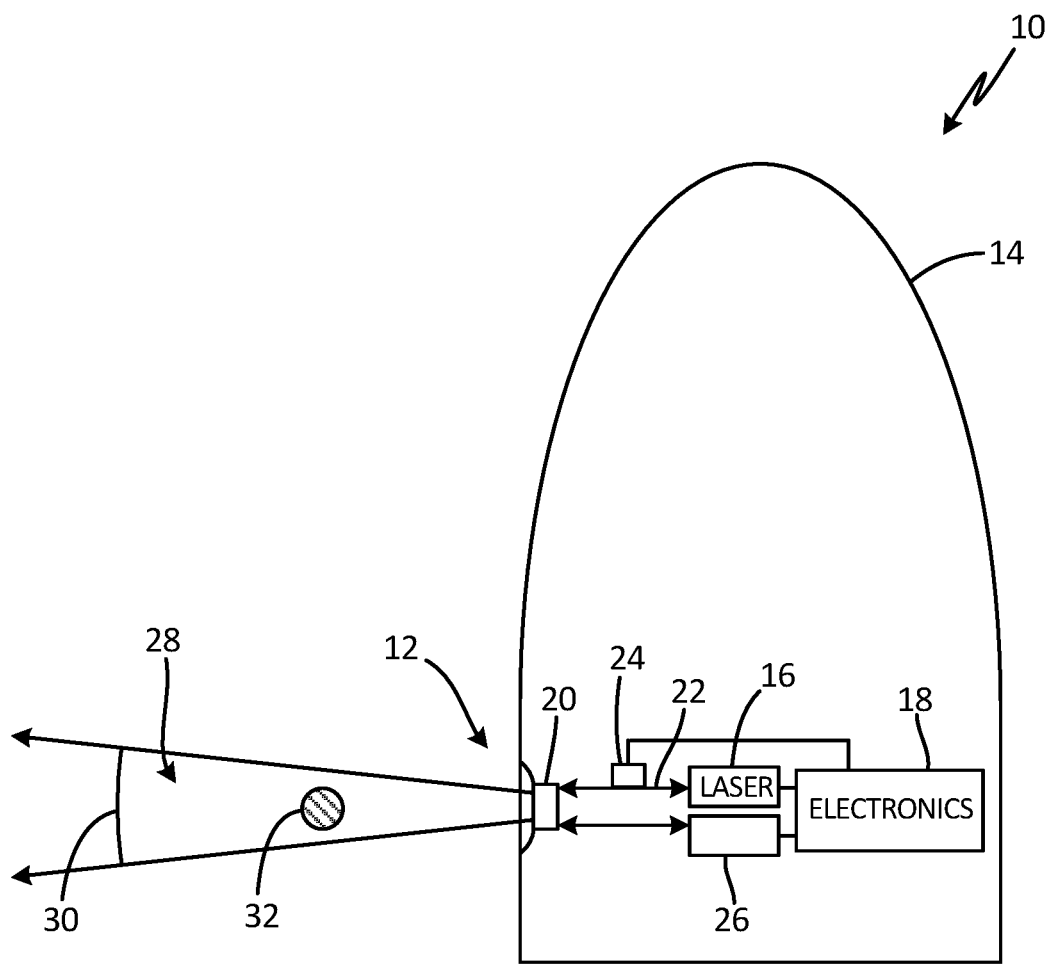
FIG. 1 is a diagram illustrating an embodiment of an optical system onboard an aircraft.

FIG. 1 is a diagram illustrating system 10 that includes optical system 12 implemented onboard aircraft 14. Optical system 12 may be an optical sensor, for example, configured to emit one or more laser beams into the atmosphere external to aircraft 14. Optical system 12 may be any aircraft sensor or other free-space laser system configured to emit light external to aircraft 14 to determine a condition. For example, optical system 12 may be a light detection and ranging (lidar) system configured to determine, among other conditions, air, ice, and/or smoke conditions based on backscatter of the emitted laser beam. While illustrated as onboard aircraft 14, optical system 12 may be implemented in any location and is not limited to use onboard a vehicle.

Optical system 12 includes laser 16, system electronics 18, transmitter and receiver optics 20, optical path 22, optical detector 24, and sensor detector elements 26. Laser 16 is configured to emit a laser beam along optical path 22 to transmitter and receiver optics 20. Transmitter optics direct the laser beam into an area of interest external to aircraft 14. Receiver optics are configured to receive backscatter, for example, from particles, molecules, and/or any other physical substance within the area of interest. The received backscatter is directed to sensor detector elements 26 which convert the received backscatter into electrical signals for analysis. The electrical signals may be analyzed by system electronics 18 to determine conditions within the desired volume of field of view 28. Sensor detector elements 26 may be photo-diodes, photon counters, focal plane arrays, or any other photo sensitive devices. Optical path 22 may include any optical elements configured to direct the emitted laser to the transmitter optics such as, for example, fiber optic cables, lenses, or any other optics. System electronics 18 may include one or more controllers, processors, application specific integrated circuits (ASICS), or any other analog or digital circuitry.

In the embodiment illustrated in FIG. 1, optical system 12 includes field of view 28 and nominal ocular hazard distance (NOHD) 30. Optical system 12 may require the use of emitted laser energy above eye safe levels within field of view 28, for example. Eye safety levels may be defined by the United States Food and Drug Administration (FDA) in 21 CFR 1040.10 and 21 CFR 1040.11, for example, or by other regulatory entities. NOHD 30 is the distance from the laser exit aperture up to which the laser beam intensity emitted by optical system 12 is at or above eye safe intensity. During operation of optical system 12, it is desirable that if a person, illustrated as hard target 32, comes within the area defined by field of view 28 and NOHD 30, that laser 16 is commanded into an eye safe state. The eye safe state may be off, or may be a reduced intensity such that the beam intensity emitted by laser 16 is below eye safe levels for a person at the location of hard target 32.

Transmitter and receiver optics 20 are configured, for example, to direct the laser beam into the area of interest, and collect backscatter of the laser beam for analysis. Transmitter and receiver optics 20 may include separate optical elements for laser transmission and backscatter collection. Theses separate optical elements may be oriented about separate optical axes.

Figure 2:
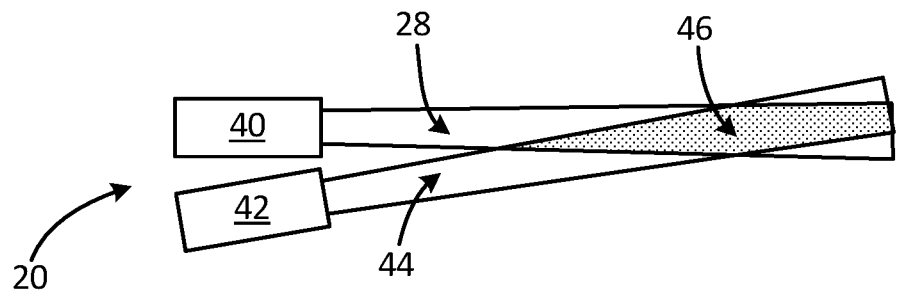
FIG. 2 is a diagram illustrating a bi-static optical system.

With continued reference to FIG. 1, FIG. 2 illustrates an embodiment of a bi-static system that includes transmitter and receiver optics 20. In the embodiment illustrated in FIG. 2, transmitter and receiver optics 20 include transmitter telescope 40 and receiver telescope 42. Field of view 28 is the field of view for a laser beam directed by transmitter telescope 40. Receiver telescope 42 has a field of view 44. Thus, receiver telescope 42 is configured to collect backscatter of the laser beam directed by transmitter telescope 40 from particles, molecules, and/or other physical substances within desired volume 46, which is the overlap between field of view 28 and field of view 44. For example, optical system 12 may be an air data sensor configured to receive backscatter off of molecules within desired volume 46 and analyze the backscatter to determine conditions of the atmosphere external to aircraft 14. Because receiver telescope 42 has a different field of view than transmitter telescope 40, hard target 32 can enter field of view 28 and not be detected by optical system 12. Thus, it may not be desirable to utilize light captured by receiver telescope 42 to identify a hard target within field of view 28.

To accommodate the issue illustrated in FIG. 2, optical detector 24 may be positioned along the laser transmitter path to detect a hard target 32 anywhere within field of view 28. The laser transmitter path, for example, may be the optical axis of the transmitter optics. Optical detector 24 may be positioned to receive retroreflections of the laser beam directed by transmitter telescope 40 into field of view 28, for example. Retroreflections may be, for example, light that reflects from hard target 32 directly back to transmitter telescope 40. Optical detector 24 may be a photo-diode, for example, or any other device capable of converting an optical signal into an electronic signal. Retroreflections may be directed from the laser transmitter path to optical detector 24 using an optical tap or other method, for example.

The output of optical detector 24 may be analyzed to determine if hard target 32 has entered field of view 28. In one embodiment, the amplitude of the retroreflections may be compared to a threshold. The threshold may be any value that corresponds to an amplitude of the retroreflections that indicate presence of hard target 32 within field of view 28. Testing may be performed specific to the implementation of optical system 12 to determine the threshold based upon, for example, the intensity of the emitted laser, the optics of system 12, and other properties specific to optical system 12. The comparison may be performed by system electronics 18 or any other electronics. For example, an analog output of detector 24 may be provided as input to a comparator. The other input to the comparator may be an analog signal indicative of the threshold, such that the output of the comparator indicates the presence of hard target 32. This output may be directly used as a shutoff signal for laser 16, for example. In another example embodiment, the output of detector 24 may be converted to a digital signal and provided to a controller or other digital logic circuit of electronics 18.

Electronics 18 may then execute an algorithm using the digital value from detector 24 to detect hard target 32.

Figure 3:
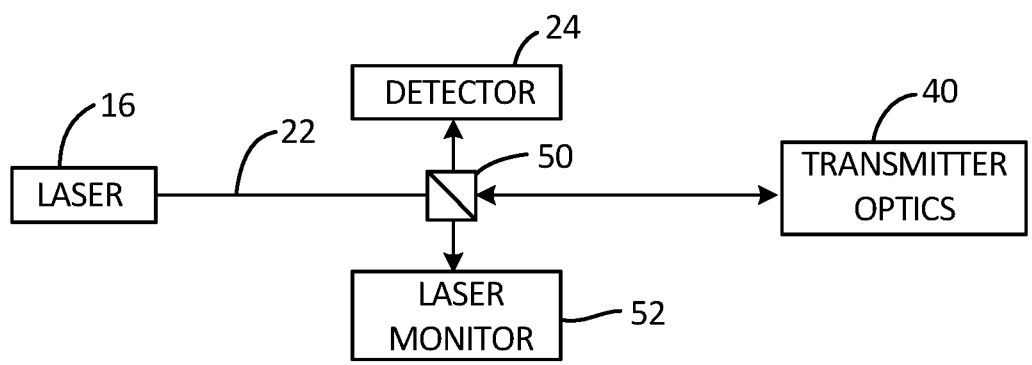
FIG. 3 is a diagram illustrating an optical transmitter path that includes an optical tap used for detecting hard objects in the field of view of an optical system.

FIG. 3 illustrates an embodiment of optical system 12 that includes tap 50 positioned along optical path 22. Tap 50 may be configured to direct a portion of the emitted laser to laser monitor 52. Laser monitor 52 may be configured, for example, to monitor the beam emitted by laser 16 to ensure proper functionality of laser 16. Tap 50 may be a beam splitter, fiber coupler, or any other optical device capable of directing a portion of the laser beam from optical path 22 to laser monitor 52. Retroreflections of the laser beam will travel back through transmitter optics 40 to tap 50. The optical properties of tap 50 will direct a portion of the retroreflections in the opposite direction of laser monitor 52. Thus, detector 24 may be positioned at an output of tap 50 opposite the laser monitor 52 to receive a portion of the retroreflections received through transmitter optics 40. Thus, optical detector 24 may be utilized to monitor the retroreflections on the laser transmitter path.

The embodiment in FIG. 3 may also be utilized in a pulsed laser system to determine a distance to hard target 32. For example, in some optical systems, laser 16 may be a pulsed laser. Laser monitor 52 may be utilized to determine when a pulse is emitted by laser 16. System electronics 18 may record the pulse time observed by laser monitor 52, for example. Optical detector 24 may then receive reflections of the pulse from the hard target 32. The timing of the received reflection may then be compared by electronics 18 to the timing of the laser pulse to determine a travel time of the pulse. The travel time of the pulse may then be utilized to determine a distance to hard target 32. Knowing NOHD 30 for optical system 12, electronics 18 can compare the distance to hard target 32 with NOHD 30. If hard target 32 is outside of NOHD 30, laser 16 may continue to operate at the present intensity.

Figure 4A:
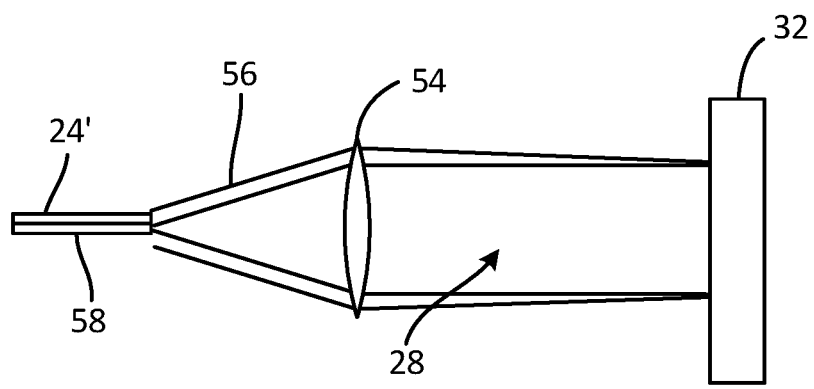
FIGS. 4a and 4b are diagrams illustrating colocated transmitter and detector optical fibers.
Figure 4B:
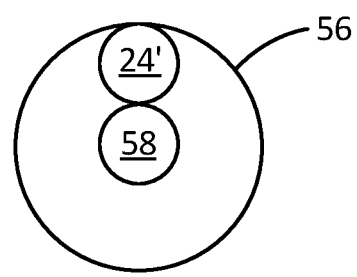

FIGS. 4a and 4b illustrate an example embodiment of an optical detector 24'. In the embodiment illustrated in FIG. 4a, transmitter optics include optics 54 and fiber 58. Optical detector 24' includes a fiber that is positioned adjacent to transmitter fiber 58. The fiber of optical detector 24' may be configured to direct received light to a detector element such as a photo-diode or other optical detector element, for example. A beam is focused and directed into field of view 28 by transmitter fiber 58 and optics 54. Hard target 32, which may be a person that has entered field of view 28, reflects the beam back toward transmitter optics 54. Hard target 32, which may be a person, will be slightly diffuse which will increase the angular width of the reflections over the width of the directed beam. The reflections 56, which pass back through transmitter optics 54, are received by the fiber of optical detector 24' and directed to a detector element (not shown).

As seen in FIG. 4b, the diffuse reflection area 56 surrounds both transmitter fiber 58 and the fiber of optical detector 24'. As hard target 32 moves further away from transmitter optics 54, the reflection area 56 decreases in diameter. Thus, when hard target 32 moves far enough away from optics 54, the fiber of detector 24' may not receive the reflected light to detect hard target 32. However, the system may be configured, for example, such that the reflection area 56 remains large enough that the fiber of detector 24' will receive the retroreflections from hard target 32 for at least as long as hard target 32 remains within NOHD 30 (FIG. 1). If hard target 32 is outside of NOHD 30 and thus, not detectable using detector 24', then it may not be necessary to turn laser 16 off because the laser at hard target 32 is below eye safe levels.

Figure 5:
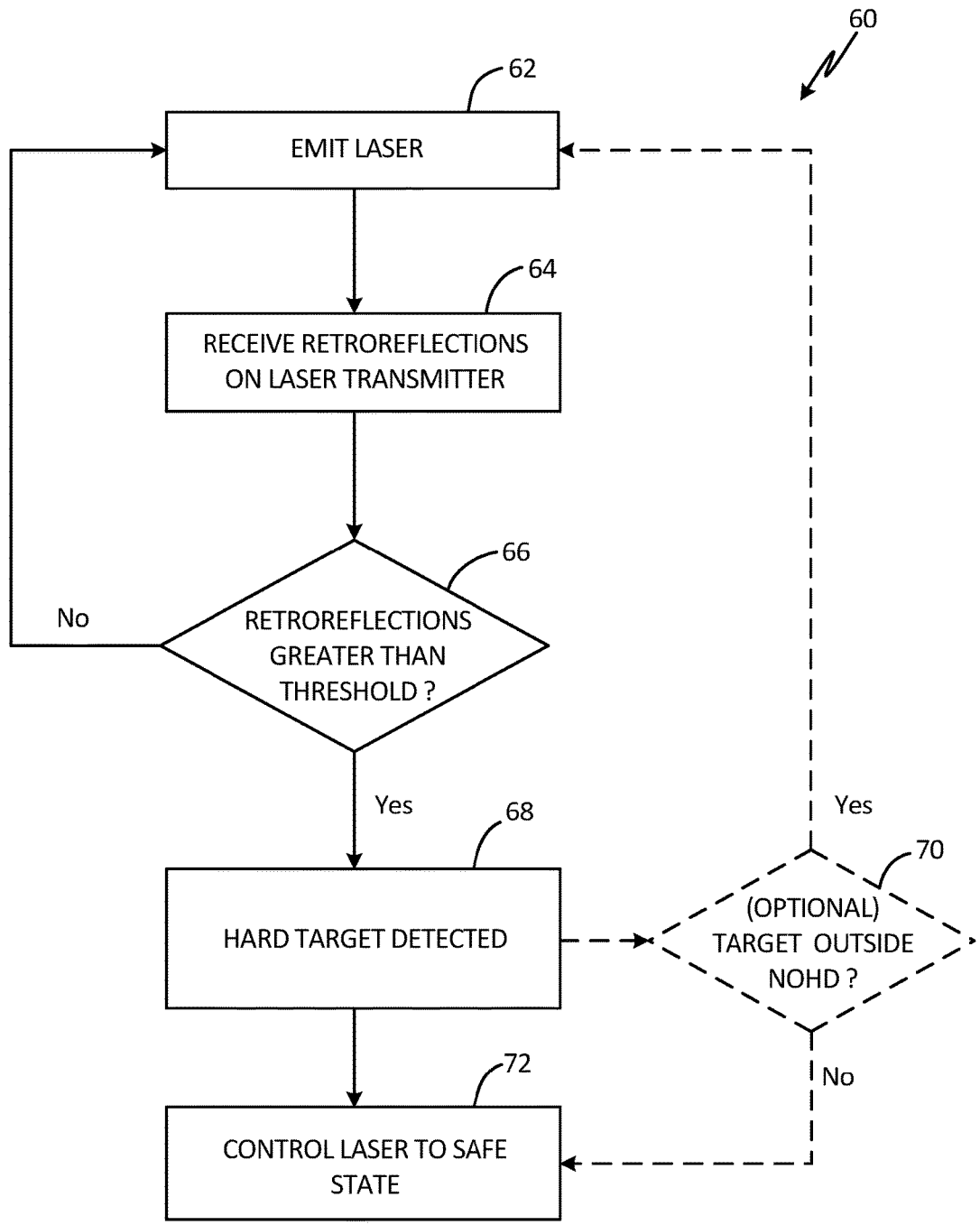
FIG. 5 is a flowchart illustrating a method of detecting a hard object in a field of view of an optical system.

FIG. 5 is a flowchart illustrating method 60 of detecting hard target 32 in field of view 28 of optical system 12. At step 62, laser 16 is controlled to emit a laser beam through transmitter optics into field of view 28. At step 64, optical detector 24, which is positioned along the laser transmission path, receives retroreflections of the laser beam. At step 66, the received retroreflections are compared to a threshold indicative of hard target 32 being within field of view 28. If the intensity of the retroreflections is greater than the threshold, method 60 proceeds to step 68 and a hard target is detected. If the intensity of the retroreflections is not greater than the threshold, no hard target is detected and method 60 returns to step 62 to continue emitting the laser.

Some optical systems may employ a pulsed laser. If laser 16 is a pulsed laser, then timing of the received retroreflections may be monitored to determine a distance of hard target 32 from optical detector 24. For example, with reference to FIG. 3, laser monitor 52 may be configured to determine when a laser pulse is provided to transmitter optics 40. Then, detector 24 can monitor for retroreflections of the pulse. System electronics 18 may then determine a distance to hard target 32 based upon the timing of the emitted pulse and the received retroflection of the pulse. Thus, for pulsed systems, method 60 may include an optional step 70 to determine if hard target 32 is outside of NOHD 30. If detected hard target 32 is outside of NOHD 30, method 60 may return to step 62. If detected hard target 32 is within NOHD 30, method 60 may proceed to step 72 and control laser 16 to a safe state, such as off.

Discussion of Possible Embodiments

The following are non-exclusive descriptions of possible embodiments of the present invention.

A hard target detection system of a free-space laser system includes a laser, an optical detector, and electronics. The laser is configured to emit a laser beam along an optical path through transmitter optics into a field of view. The optical detector is positioned along a laser transmitter path and configured to receive retroreflections of the laser beam. The electronics are configured to determine if an output of the optical detector is indicative of presence of a hard target within the field of view, and control the laser to a safe state if the output is indicative of presence of the hard target.

The hard target detection system of the preceding paragraph can optionally include, additionally and/or alternatively, any one or more of the following features, configurations and/or additional components:

A further embodiment of the foregoing hard target detection system, wherein the free-space laser system includes receiver optics configured to direct backscatter of the laser beam to sensor detector elements, and wherein the optical detector is separate from the sensor detector elements.

A further embodiment of any of the foregoing hard target detection systems, further including a tap positioned along the optical path and configured to direct a portion of the laser beam to a laser monitor and a portion of the retroreflections to the optical detector.

A further embodiment of any of the foregoing hard target detection systems, wherein the tap is a beam splitter.

A further embodiment of any of the foregoing hard target detection systems, wherein the optical path and the transmitter optics include a first fiber optic cable, and wherein the optical detector includes a second fiber optic cable, and wherein the laser beam is directed into the field of view through a transmitter end of the first fiber optic cable, and wherein the second fiber optic cable receives the retroreflections through a detector end of the second fiber optic cable, and wherein the transmitter end is located adjacent to the detector end.

A further embodiment of any of the foregoing hard target detection systems, wherein the electronics are configured to determine if an output of the optical detector is indicative of presence of the hard target by comparing an amplitude of the retroreflections to a threshold, and wherein the safe state is an off state of the laser.

A further embodiment of any of the foregoing hard target detection systems, wherein the laser is configured to emit the laser beam as a pulsed laser beam, and wherein the electronics are further configured to determine if the hard target is greater than a nominal ocular hazard distance away from the transmitter optics.

A further embodiment of any of the foregoing hard target detection systems, wherein the free-space laser system is a lidar system implemented onboard an aircraft.

A method of detecting hard targets in a free-space laser system includes emitting a laser beam along an optical path to transmitter optics; directing, by the transmitter optics, the beam into a field of view along a laser transmitter path; receiving, by an optical detector positioned along the laser transmitter path, retroreflections of the laser beam; detecting a hard target within the field of view based on the retroreflections; and controlling the laser to a safe state if the hard target is detected within the field of view.

The method of the preceding paragraph can optionally include, additionally and/or alternatively, any one or more of the following features, configurations and/or additional components:

A further embodiment of the foregoing method, further including receiving, by receiver optics, backscatter of the laser beam; directing the received backscatter to sensor detector elements; and determining properties of a volume within the field of view based upon output of the sensor detector elements.

A further embodiment of any of the foregoing methods, further including directing, by a tap positioned along the optical path, a portion of the laser beam to a laser monitor; and directing, by the tap, a portion of the retroreflections to the optical detector.

A further embodiment of any of the foregoing methods, wherein the tap is a beam splitter.

A further embodiment of any of the foregoing methods, wherein the optical path and the transmitter optics include a first fiber optic cable, and wherein the optical detector includes a second fiber optic cable, and wherein directing, by the transmitter optics, the laser beam into the field of view along a laser transmitter path includes directing the laser beam into the field of view through a transmitter end of the first fiber optic cable, and wherein receiving, by the optical detector, the retroreflections of the laser beam along the transmitter path includes receiving the retroreflections through a detector end of the second fiber optic cable, wherein the transmitter end of the first fiber optic cable is located adjacent to the detector end of the second fiber optic cable.

A further embodiment of any of the foregoing methods, wherein detecting the hard target within the field of view based on the retroreflections includes detecting the hard target if an amplitude of the retroreflections is greater than a threshold.

A further embodiment of any of the foregoing methods, wherein controlling the laser to the safe state includes turning the laser off.

A further embodiment of any of the foregoing methods, wherein emitting the laser beam includes emitting the laser beam as a pulsed laser beam.

A further embodiment of any of the foregoing methods, wherein controlling the laser to the safe state if the output of the optical detector is greater than the threshold includes detecting a hard target within the field of view if the output of the optical detector is greater than the threshold.

A further embodiment of any of the foregoing methods, wherein controlling the laser to the safe state further includes determining a distance to the hard target based upon timing of the pulsed laser beam; and controlling the laser to the safe state if the hard target is within a nominal ocular hazard distance of the transmitter optics.

A further embodiment of any of the foregoing methods, wherein the free-space laser system is a lidar system implemented onboard an aircraft.

A further embodiment of any of the foregoing methods, wherein the optical detector is a photo-diode.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A hard target detection system of a free-space laser system, the hard target detection system comprising:
   a laser configured to emit a laser beam along an optical path through transmitter optics into a field of view;
   an optical detector positioned along a laser transmitter path and configured to receive retroreflections of the laser beam;
   electronics configured to determine if an output of the optical detector is indicative of presence of a hard target within the field of view, and control the laser to a safe state if the output is indicative of presence of the hard target; and
   receiver optics configured to direct backscatter of the laser beam to sensor detector elements, and wherein the optical detector is separate from the sensor detector elements.

2. The hard target detection system of claim 1, further comprising:
   a tap positioned along the optical path and configured to direct a portion of the laser beam to a laser monitor and a portion of the retroreflections to the optical detector.

3. The hard target detection system of claim 2, wherein the tap is a beam splitter.

4. The hard target detection system of claim 1, wherein the optical path and the transmitter optics include a first fiber optic cable, and wherein the optical detector includes a second fiber optic cable, and wherein the laser beam is directed into the field of view through a transmitter end of the first fiber optic cable, and wherein the second fiber optic cable receives the retroreflections through a detector end of the second fiber optic cable, and wherein the transmitter end is located adjacent to the detector end.

5. The hard target detection system of claim 1, wherein the electronics are configured to determine if an output of the optical detector is indicative of presence of the hard target by comparing an amplitude of the retroreflections to a threshold, and wherein the safe state is an off state of the laser.

6. The hard target detection system of claim 1, wherein the laser is configured to emit the laser beam as a pulsed laser beam, and wherein the electronics are further configured to determine if the hard target is greater than a nominal ocular hazard distance away from the transmitter optics.

7. The hard target detection system of claim 1, wherein the free-space laser system is a lidar system implemented onboard an aircraft.

8. A method of detecting hard targets in a free-space laser system, the method comprising:
   emitting a laser beam along an optical path to transmitter optics;
   directing, by the transmitter optics, the laser beam into a field of view along a laser transmitter path;
   receiving, by an optical detector positioned along the laser transmitter path, retroreflections of the laser beam;
   detecting a hard target within the field of view based on the retroreflections;
   controlling the laser to a safe state if the hard target is detected within the field of view;
   receiving, by receiver optics, backscatter of the laser beam;
   directing the received backscatter to sensor detector elements; and
   determining properties of a volume within the field of view based upon output of the sensor detector elements.

9. The method of claim 8, further comprising:
   directing, by a tap positioned along the optical path, a portion of the laser beam to a laser monitor; and
   directing, by the tap, a portion of the retroreflections to the optical detector.

10. The method of claim 9, wherein the tap is a beam splitter.

11. The method of claim 8, wherein the optical path and the transmitter optics include a first fiber optic cable, and wherein the optical detector includes a second fiber optic cable, and wherein directing, by the transmitter optics, the laser beam into the field of view along a laser transmitter path comprises directing the laser beam into the field of view through a transmitter end of the first fiber optic cable, and wherein receiving, by the optical detector, the retroreflections of the laser beam along the transmitter path comprises receiving the retroreflections through a detector end of the second fiber optic cable, wherein the transmitter end of the first fiber optic cable is located adjacent to the detector end of the second fiber optic cable.

12. The method of claim 8, wherein detecting the hard target within the field of view based on the retroreflections comprises detecting the hard target if an amplitude of the retroreflections is greater than a threshold.

13. The method of claim 8, wherein controlling the laser to the safe state comprises turning the laser off.

14. The method of claim 8, wherein emitting the laser beam comprises emitting the laser beam as a pulsed laser beam.

15. The method of claim 14, wherein controlling the laser to the safe state if the output of the optical detector is greater than the threshold comprises detecting a hard target within the field of view if the output of the optical detector is greater than the threshold.

16. The method of claim 15, wherein controlling the laser to the safe state further comprises:
   determining a distance to the hard target based upon timing of the pulsed laser beam; and controlling the laser to the safe state if the hard target is within a nominal ocular hazard distance of the transmitter optics.

17. The method of claim 8, wherein the free-space laser system is a lidar system implemented onboard an aircraft.

18. The method of claim 8, wherein the optical detector is a photo-diode.

* * * * *